United States Patent
Bond

[19]

[11] Patent Number: 6,047,481
[45] Date of Patent: Apr. 11, 2000

[54] RETAINING ADAPTER FOR MECHANICAL MEASURING TAPE DEVICES

[76] Inventor: William R Bond, 4710 Asdee La., Woodbridge, Va. 22192

[21] Appl. No.: 09/071,736

[22] Filed: May 1, 1998

[51] Int. Cl.[7] .................................................. G01B 3/10
[52] U.S. Cl. .................................. 33/768; 33/758; 33/761
[58] Field of Search .............................. 33/755, 757, 758, 33/761, 768, 769, 770, 668

[56] References Cited

U.S. PATENT DOCUMENTS

| | | | |
|---|---|---|---|
| 2,262,664 | 11/1941 | Bresson | 33/755 |
| 2,658,234 | 11/1953 | Trammell, Sr. et al. | 33/761 |
| 2,759,696 | 8/1956 | Nelson | 33/761 |
| 2,807,886 | 10/1957 | Aciego | 33/761 |
| 3,036,791 | 5/1962 | Siggelkow | 33/758 |
| 3,100,941 | 8/1963 | Taylor | 33/761 |
| 3,242,578 | 3/1966 | Moll | 33/761 |
| 3,662,969 | 5/1972 | King | 33/767 |
| 4,113,199 | 9/1978 | Marino | 33/761 |
| 4,200,984 | 5/1980 | Fink | 33/755 |
| 4,598,027 | 7/1986 | Johnson | 33/769 |
| 4,908,954 | 3/1990 | Johnson | 33/768 |
| 5,020,235 | 6/1991 | Martin | 33/668 |
| 5,333,391 | 8/1994 | Eldridge et al. | 33/760 |
| 5,390,426 | 2/1995 | Hull | 33/770 |
| 5,406,711 | 4/1995 | Graham | 33/770 |
| 5,430,951 | 7/1995 | Jacky | 33/770 |
| 5,746,004 | 5/1998 | Wertheim | 33/768 |
| 5,842,284 | 12/1998 | Goldman | 33/770 |

FOREIGN PATENT DOCUMENTS 6-281401  10/1994  Japan ........................ 33/755

*Primary Examiner*—G. Bradley Bennett
*Attorney, Agent, or Firm*—Palmer C. DeMeo

[57] ABSTRACT

A retaining adapter for a mechanical measuring tape device extends the versatility of the tape device for construction workers. The retaining adapter can be removable or fixed to the housing of the mechanical measuring tape device. The retaining adapter has a drag hook and a drop hook, either of which can be attached to the object or construction piece to be measured. The use of the retaining adapter permits the construction worker to use the conventional measuring tape device beyond his or her natural reach.

24 Claims, 4 Drawing Sheets

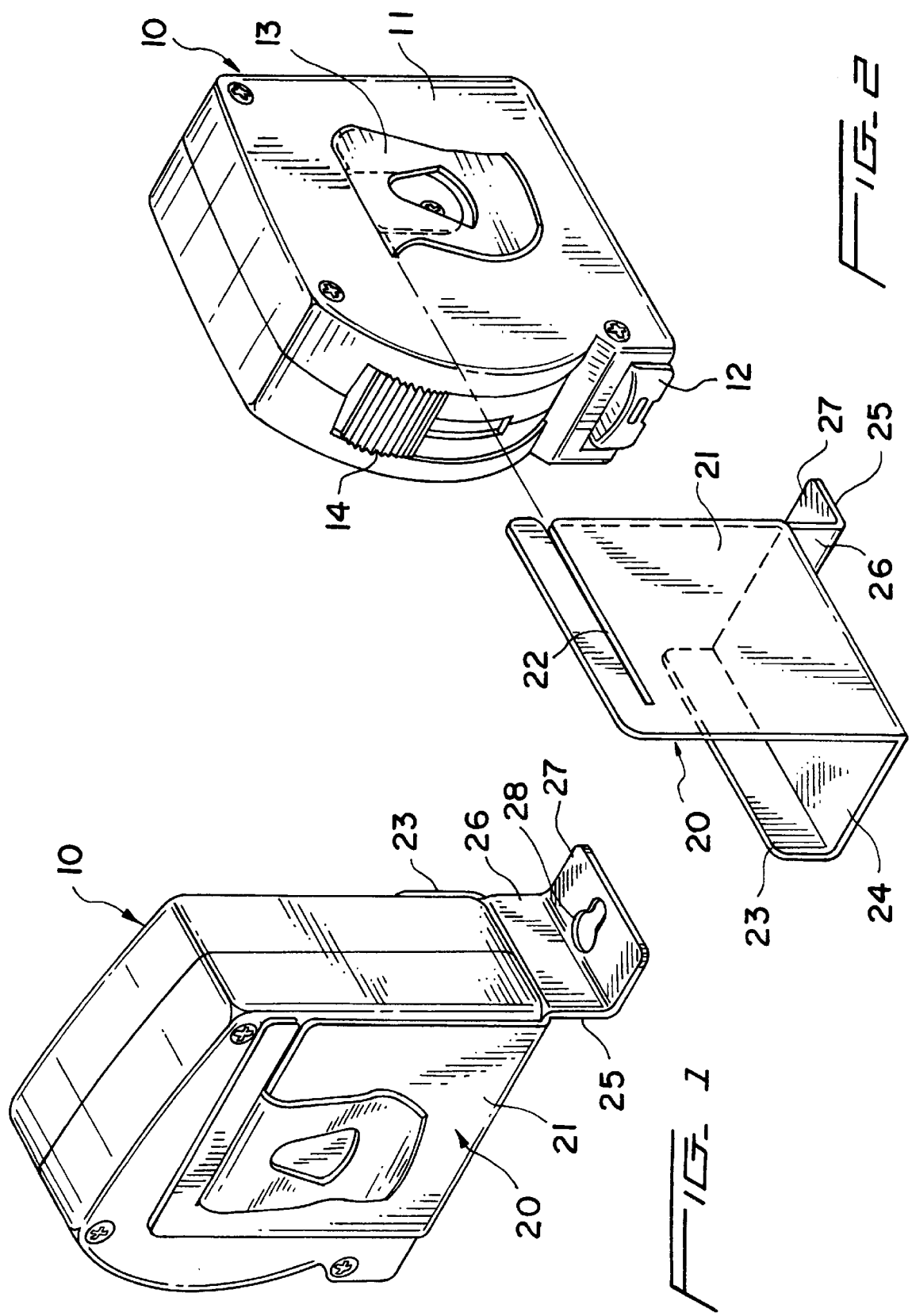

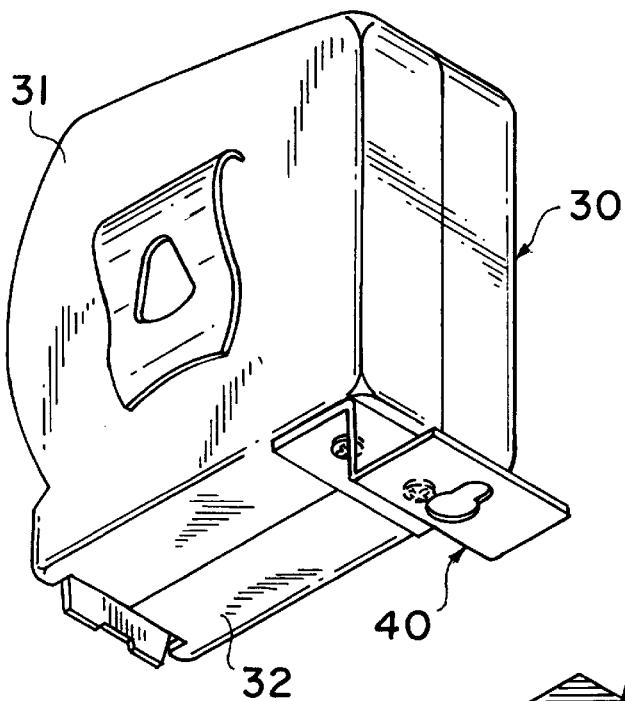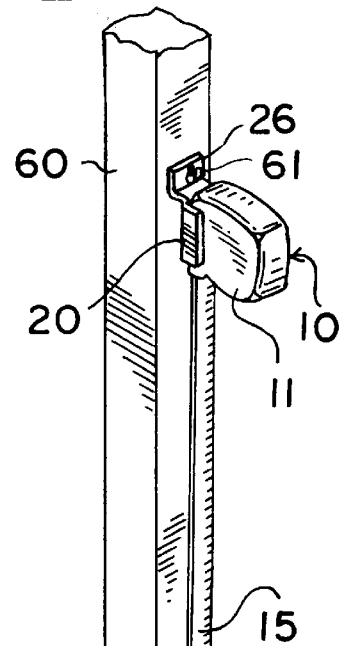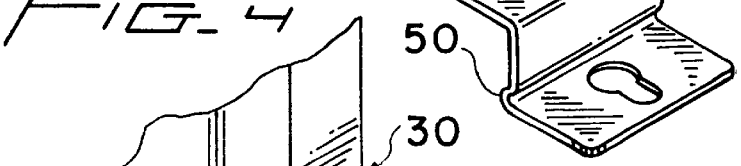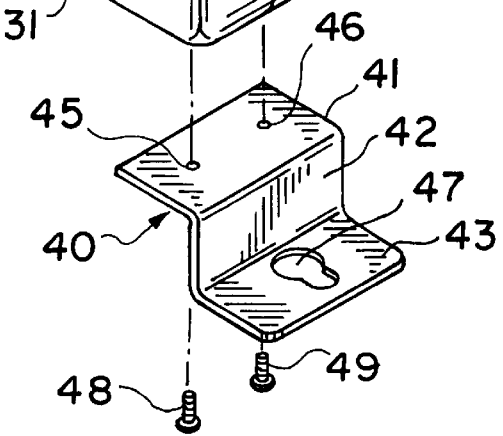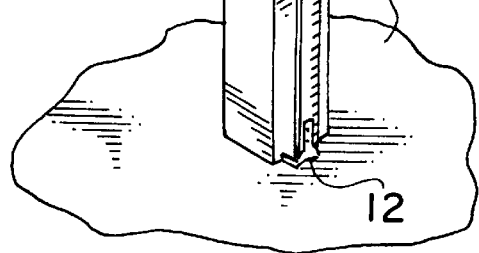

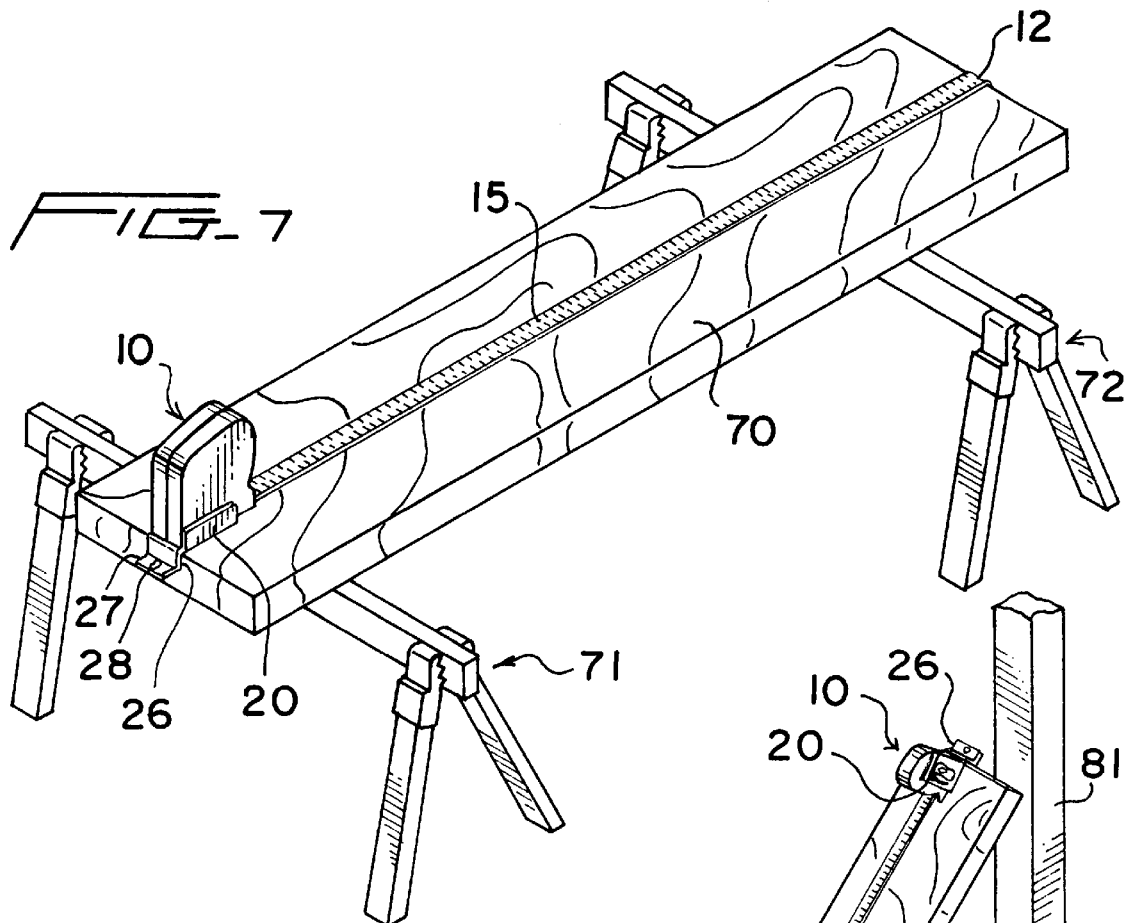
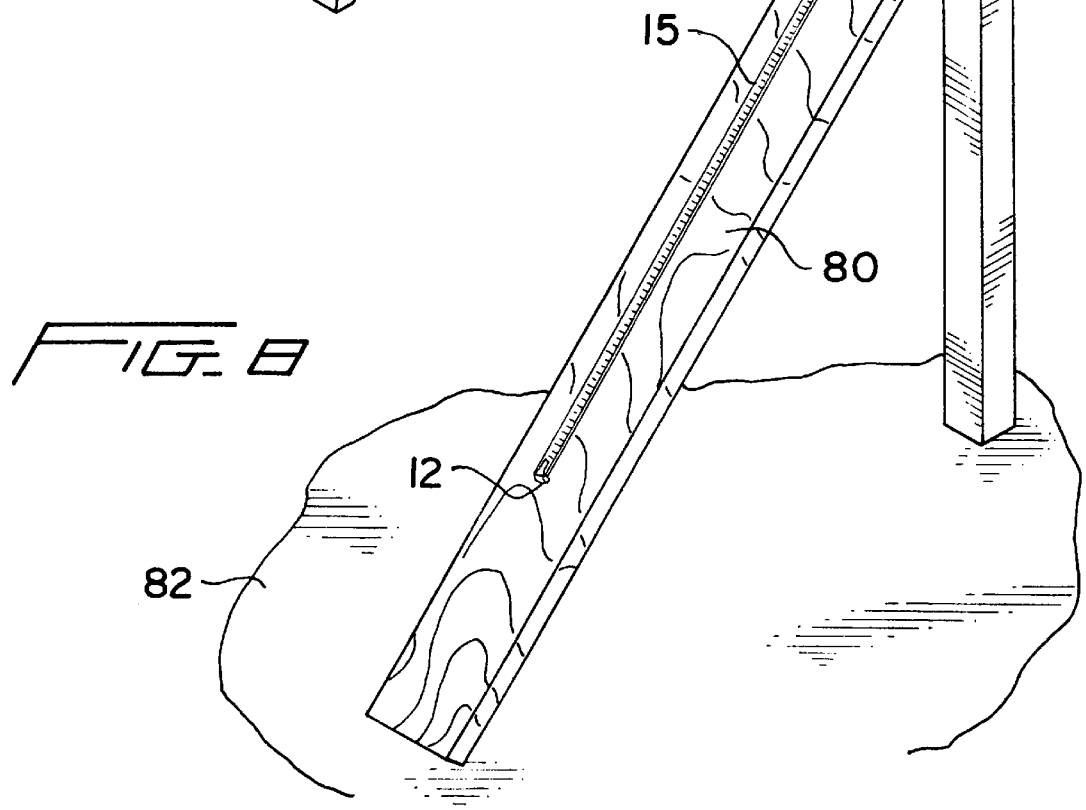

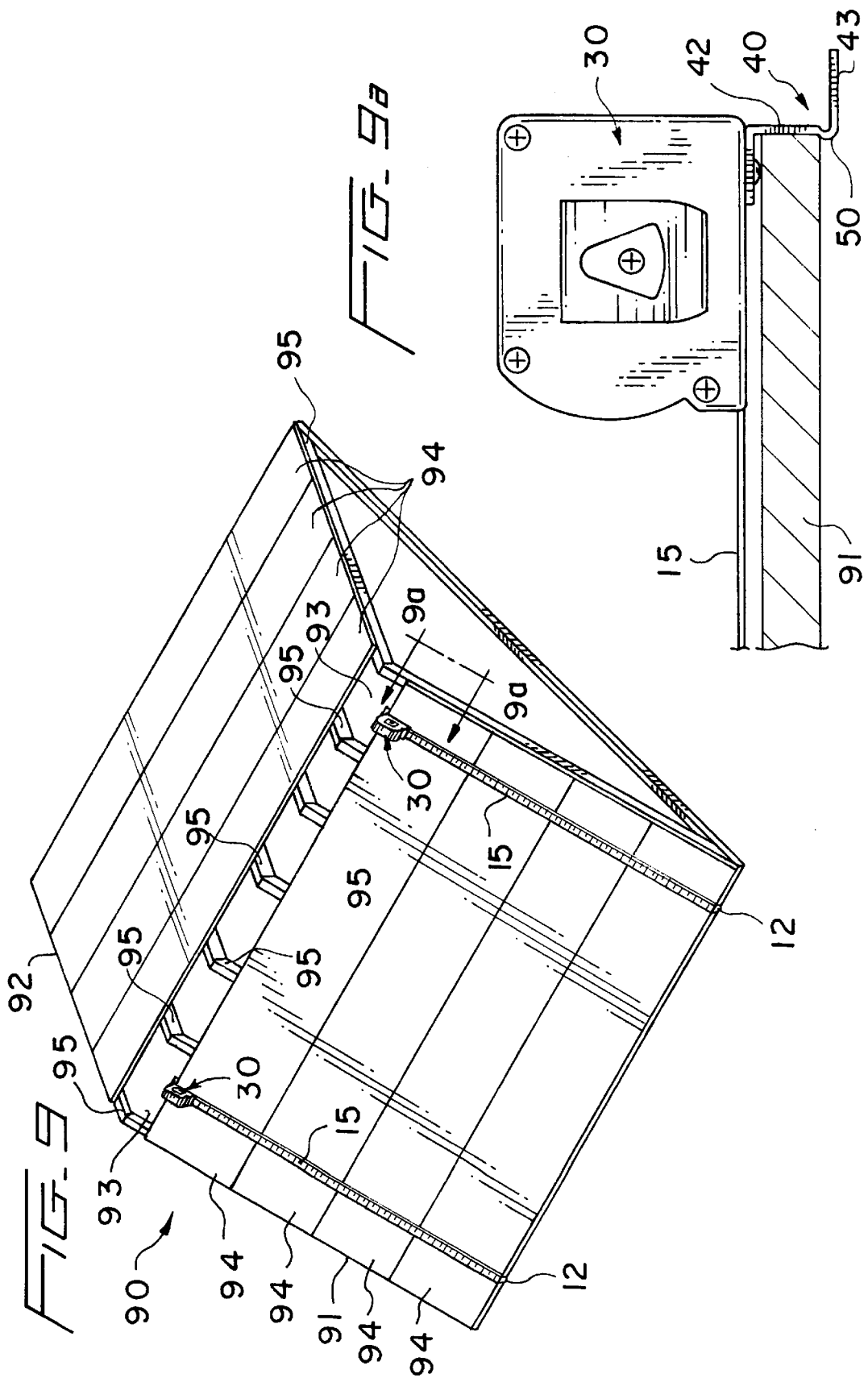

RETAINING ADAPTER FOR MECHANICAL MEASURING TAPE DEVICES

BACKGROUND OF THE INVENTION

1. Field of the Invention

The present invention relates to mechanical measuring tape devices used generally in the construction field. In particular, a retaining adapter of the present invention is slidably fitted over the housing of a mechanical measuring tape device having a locking slide button and a belt clip. The retaining adapter for the mechanical measuring tape device provides a wider range of options for the construction worker in facilitating the measurement of various construction projects and objects. Moreover, in some measuring tasks which extend beyond the physical manual reach of a construction worker, the use of the retaining adapter for the mechanical measuring tape device enables the construction worker to accomplish these tasks with ease. The retaining adapter has a holding and securement portion which enables the measuring tape device housing to be fixed at one end of an object to be measured and the measuring tape itself to be pulled along a part or the whole length of the object by a single construction worker while the locking mechanism of the tape is in the locked position.

2. Description of the Related Art

There are several mechanical measuring tape devices known in the art which have some means to secure or hold a measuring tape housing at one desired part of an object to be measured. The Moll U.S. Pat. No. 3,242,578 discloses a measuring tape having a housing with an apertured tab extending from a side of the housing at the opposite end of the housing from which the tape is reeled. Moll teaches that the housing may be hung on a wall by driving a nail or the like through the apertured tab and then extending the tape as far as is required. Another measuring tape device is disclosed in the King U.S. Pat. No. 3,662,969 wherein the housing for the measuring tape has a tape tensioning mechanism attached to the bottom of the tape housing which mechanism includes a ring shaped anchor whereby the housing can be fixed to an object to be measured by means of a nail. The Martin U.S. Pat. No. 5,020,235 discloses a bracket attached to a measuring tape housing wherein the bracket has protrusions which form indentations marking the measured location when the bracket is forced against the surface of a wall.

SUMMARY OF THE INVENTION

It is a general purpose of the use of the retaining adapter of this invention to expand the use and versatility of the conventional mechanical measuring tape device having a locking slide button and a belt clip. By attaching the retaining adapter to the housing of a conventional mechanical measuring tape device, a construction worker, e.g., carpenter, roofer, etc., can free up both hands for taking measurements of the work object especially work objects which extend beyond his or her normal reach. The retaining adapter of this invention can be removable from, fixed to, or integral with the housing of the mechanical measuring tape device as will be described in more detail in the preferred embodiments of the invention hereinbelow. The size of the retaining adapter will depend on the particular housing size of the mechanical measuring tape device itself since the housing size may vary depending, inter alia, on the particular manufacturer of the tape device. The retaining adapter has two mechanisms for holding or securing the mechanical measuring tape device at one end or at one location of an object or construction piece to be measured, a drop hook which will hook over the edge of an object or construction piece to be measured and a drag hook which will be fixed to a particular location on an object or construction piece to be measured by hooking it over a nail placed at that location. With the retaining adapter attached to the housing of the mechanical measuring tape device, the construction worker can fix the mechanical measuring tape device to an object or construction piece to be measured, using either the drop hook or drag hook of the retaining adapter. The construction worker then pulls the measuring tape from the housing along the whole length or partial length of the object or construction piece depending on the measurement or measurements to be made. If the drag hook is used to take a measurement or measurements on or along the object or construction piece, then the locking slide button of the mechanical measuring tape device will be in the locked position to prevent the measuring tape from reeling back into the housing and thus permitting the construction worker to take the desired measurement or measurements. If the drop hook is used to take a measurement or measurements along the whole length of the object or construction piece, the drop hook is hooked over one edge of the object or construction piece and the head of the measuring tape is hooked over the opposite edge of the object or construction piece. In this latter situation, the locking slide button can be in the locked or unlocked position. In either of the situations explained above or in any of the examples explained below, both hands of the construction worker are free to take the required measurement or measurements of the object or construction piece to be measured.

It is an object of this invention to make the use of the conventional mechanical measuring tape device more versatile.

It is another object of this invention to permit the construction worker to use the conventional mechanical measuring tape device beyond his or her natural reach.

It is yet another object of this invention to make certain measuring tasks easier by utilising the retainer adapter of this invention with a conventional mechanical measuring tape device.

The foregoing objectives, features and advantages together with other objectives, features and advantages will become more apparent from the following more detailed description of the invention, as illustrated in the accompanying drawings in which reference numerals refer to like parts throughout the different views. The drawings are schematic and not necessarily to scale, emphasis being placed instead upon illustrating principles of the invention.

BRIEF DESCRIPTION OF THE DRAWINGS

FIG. 1 is a perspective view of a mechanical measuring tape device with a first embodiment of the retaining adapter of this invention;

FIG. 2 is an exploded perspective view of a mechanical measuring tape device with the retaining adapter of this invention;

FIG. 3 is a perspective view of a mechanical measuring tape device with a second embodiment of the retaining adapter of this invention;

FIG. 4 is an exploded perspective view of FIG. 3;

FIG. 5 is a modification of the adapter shown in FIG. 4;

FIG. 6 shows a first example of the use of a mechanical measuring tape device with the retaining adapter of this invention;

FIG. 7 shows a second example of the use of a mechanical measuring tape device with the retaining adapter of this invention;

FIG. 8 shows a third example of the use of a mechanical measuring tape device with the retaining adapter of this invention; and FIG. 9 shows a fourth example of the use of a mechanical measuring tape device with the FIG. 5 modification of the retaining adapter of this invention.

FIG. 9a shows an enlarged side view through the arrowed section 9a, 9a of FIG. 9.

DETAILED DESCRIPTION OF THE PREFERRED EMBODIMENTS

Referring to FIGS. 1 and 2, there is shown a mechanical measuring tape device 10 with the first embodiment of the retaining adapter 20 of this invention affixed thereto. The retaining adapter 20 has an elongated base 24 with a long side 21 and a short side 23 extending from the longitudinal edges thereof and a hook element 25 extending from one of the short edges of the retaining adapter 21. The long side 21 of the retaining adapter 21 has an elongated slot 22 which slidingly fits into the belt clip 13 of the measuring tape housing 11. The hook element 25 comprises a drop hook 26 and a drag hook 27 with an aperture 28 therein. The aperture 28 has the shape of a snowman so that nails of different sizes can be used to fix the measuring tape device to an object to be measured. As shown in FIG. 2, the mechanical measuring tape device 10 includes the conventional extendable tape 15 (not seen in FIGS. 1 and 2), the bent flat head 12 of the measuring tape 15, and the locking slide button 14. The drop hook 26 of the retaining adapter 20 hooks over an edge of an object to be measured and the drag hook 27 is fixed to an object to be measured by means, for example, of a nail which has been previously driven into the object to be measured and fitted through the snowman shaped aperture 28 of the drag hook 27. The functions of the drop hook 26 and the drag hook 27 will become clearer in the examples given hereinafter.

Referring now to FIGS. 3 and 4, there is shown a second embodiment of the retaining adapter of this invention wherein the adapter 40 is fixed to the base 32 of the housing 31 of the mechanical measuring tape device 30. The retaining adapter 40 can be fixed to the base 32 of the housing 31 by means of screws 48 and 49 as shown in FIG. 4 or by any other conventional means. For examples, the retaining adapter 40 may be welded to the base of the housing 31 or may even be a part of the housing 31 itself. The retaining adapter 40 has a support section 41 with a pair of spaced apertures 45 and 46 therein for the screws 48 and 49 to pass therethrough, a drop hook 42 extending downwardly at 90 degrees from the support section 41 and a drag hook 43 extending outwardly at 90 degrees from the drop hook 42. The drop hook 43 has a snowman shaped aperture 47 therein. The functions of the drop hook 42 and the drag hook 43 of the second embodiment of the retaining adapter 40 are similar to those explained hereinbefore for the drop hook 26 and the drag hook 27 of the first embodiment of the retaining adapter 30.

Referring now to FIG. 5, there is shown a third embodiment of the retaining adapter of this invention which is slightly different from that shown in the second embodiment of this invention in that there is a protrusion 50 between the drop hook 42 and the drag hook 43 of the retaining adapter 40. This protrusion 50 helps to lock the drop hook 42 over an edge of the object to be measured and thereby more securely affixes the measuring tape device to the object. This function will be more clearly understood in one of the examples of use hereinafter described for FIG. 9 and 9a. Although not shown, this protrusion can also be incorporated in the first embodiment of the retaining adapter 20 of this invention.

All embodiments of the adapter of this invention can be made from metal, plastic or hard rubber. The manufacture of the retaining adapters can be made by conventional and well known methods. The actual size of the retaining adapter will depend on the particular housing size of the mechanical measuring tape device used since the width, length, and height of the housings for these tape devices may vary depending, inter alia, on the particular manufacturer of the tape devices. If the retaining adapter is made from plastic or hard rubber, the retaining adapter can be made by molding techniques old and well known in the art.

In order to manufacture the retaining adapter 20 of the FIG. 1 embodiment from metal for a 30 foot mechanical measuring tape device 10 made by a well known manufacturing company, a blank of the correct size and shape can be stamped from sheet metal of, for example, 18 gauge steel and then bent in several steps into the desired shape of the retaining adapter. Such a retaining adapter 20 for a 30 foot mechanical measuring tape device 10 will have the following approximate dimensions: a base 24 (1 and ½ inch by 2 and ¾ inch); a long side 21 (2 and ¾ inch by 2 and ¾ inch); a short side 23 (⅝ inch by 2 and ¾ inches); a drop hook 26 (½ inch by 1 and ½ inches); a drag hook 27 (9/16 inch by 1 and ½ inches); and the snowman aperture 28 (large aperture with diameter of ⅜ inch overlapping a smaller aperture with diameter of ¼ inch). The slot 22 is approximately 2 and ½ inches from the base 24 of the retaining adapter 20. The slot is approximately 2 inches long and between 1/16 to 2/16 inch wide. If the retaining adapter 20 includes a protrusion between the drop and drag hooks 26, 27, it can be between 1/16 inch and ⅛ inch. However, the inner dimension of the drop hook between the base and drag hook should be just slightly more than ½ inch in order for the drop hook to fit snugly over an edge of an object or construction piece such as plywood or sheet-rock with a half-inch thickness.

In order to manufacture the retaining adapter 40 of the FIG. 3 embodiment, for example, a process similar to that for the FIG. 1 embodiment may be used. Although not shown, a retaining adapter similar in structure to that of the FIG. 3 embodiment may be fabricated as an integral part of the housing 31 for the mechanical measuring tape device; the retaining adapter would consist of a stepped extension extending from the base 32 of the housing 31 or from the back upright side of the housing 31.

FIG. 6 shows one application of the mechanical measuring tape device with the retaining adapter 20 affixed to the housing 11 thereof. If a construction worker desires to mark off several spaced measurements along the length of a 4×4 post 60 down to the floor 62, a nail 61 is driven into the post at an appropriate height and the mechanical measuring tape device 10 is hooked over it via the aperture in the drag hook 26. With the locking slide button 14 (not seen in FIG. 6) in the locking position, the construction worker pulls the bent flat head 12 of the measuring tape 15 along the length of the post 60 down to the floor 62. Since the locking slide button 14 is in the locked position, the measuring tape will not be reeled back into the housing 11 of the mechanical measuring tape device 10. The construction worker can then make the desired markings on and along the post 60; he or she can do so easily since neither of his or her hands is required to hold the housing 11 in place. Of course, a mechanical measuring tape device with a fixed retaining adapter 40 as shown in either FIG. 3 or FIG. 5 can also be used in this application as well as in the applications shown in FIGS. 7, 8 or 9.

FIG. 7 shows another application of the mechanical measuring tape device 10 with the retaining adapter 20 of this invention. When a construction worker wants to take measurements along the length of an elongated object such as a plank 70 of wood supported, for example, on a pair of sawhorses 71, 72, he or she can simply attach the mechanical measuring tape device 10 at one end of the plank by hooking the drop hook 26 of the retaining adapter 20 over one edge of the plank 70 and pulling the bent flat head 12 of the extendable tape 15 over the surface of the plank 70 and then hooking the bent flat head 12 of the tape 15 over the opposite edge of the plank 70; this can be done with the locking slide button 14 in the locked or unlocked position. The preceding procedure is done without the mechanical measuring tape device 10 tipping over because of the flat bottom surface of the adapter's base 24 and the tension on the measuring tape 15 in the case when the locking slide button 14 is in the unlocked position. Tipping over of the mechanical measuring tape device 10 is also prevented because of the flat bottom surface of the retaining adapter's base 24 in the case where the drop hook 26 is used. In the case where the drag hook 27 of the retaining adapter 20, a flat-head nail is used, the head of which is located close to the surface of the object or construction piece to be measured but sufficiently spaced therefrom so that the snowman shaped aperture 28 can pass thereover. The close spacing limits the movement of the mechanical measuring tape device while it is hooked over the flat-head nail.

A third application of the mechanical measuring tape device 10 with the retaining adapter 20 of this invention is shown in FIG. 8. When a construction worker wants to take a measurement or measurements along an object such as a plank 80 of wood with one end leaning against a post 81 and the opposite end resting on the ground or floor 82, he or she simply hooks the mechanical measuring tape device 10 at the top edge of the plank 80 with the drop hook 26 of the retaining adapter 20 and, with the locking slide button 14 in the locked position, pulls the bent flat head 12 of the extendable tape 15 down over the surface of the plank until the tape 15 is sufficiently exposed for him to take his measurement or measurements. In this application, it is necessary to take into account the length of the base of the housing 11 which, for a 30 foot mechanical measuring tape device 10, is conventionally 3 inches. Usually, the length of the base of the housing 11 for various mechanical measuring tape devices is given on one side of the housing. In this application, as well as in the previous applications, the construction worker's hands are free to take whatever measurements are necessary since neither of his or her hands is required to hold the mechanical measuring tape device 10 in place.

FIG. 9 shows a fourth application of the retaining adapter 40 (with protrusion 50) of this invention. The application pertains to the laying down of shingles on an inclined roof of a building and, particularly, to the preliminary step of marking chalk lines (every 5 inches) on the tar or felt paper 94 already laid down on the roof 90. Further details about this process are obtainable from U.S. Pat. No. 5,687,539 with reference therein to FIG. 4 and the description thereof. In FIG. 9, there is shown a gabled-type roof 90 with a front side 91 and a rear side 92 with roof trusses 95 supporting them. Between the roof sides 91 and 92 at the apex of roof 90, there are air spaces 93 as are now conventional in the building art. On each side, sheets 94 of tar or felt paper have been laid down. A first mechanical measuring tape device 30 with a retaining adapter 40 is hooked over the top edge of the front side 91 of the roof 90 at the right hand edge thereof and spaced a few inches therefrom. With the locking slide button 14 of the mechanical measuring tape device 30 in the locked position, the measuring tape 15 is pulled downwardly over the the front side 91 of the roof 90 until it reaches the opposite bottom edge thereof and then the bent flat head 12 of the tape is hooked thereover as shown in FIG. 9. A second mechanical measuring tape device 30 is positioned near the opposite side edge of the front side 91 of the roof 90 in a similar manner as was done for the first mechanical measuring tape device 30. Although the locking slide button 14 need not be in the locked position, it is recommended for safety reasons. In this application, either the first or second embodiments of the retaining adapter of this invention can be used but with the modification of a protrusion 50 between the drop and drag hooks since the plywood used in the construction of the roof 90 is ½ inch thick. By using this modification of the retaining adapter, a more secure grip of the mechanical measuring tape device 30 to the roof 90 will be effected. Once the two mechanical measuring tape devices 30, 30 have been positioned and secured, as explained previously, two roofers can then proceed to mark the front side 91 of the roof 90 (every 5 inches) utilizing a chalked string. After the front side 91 of the roof 90 has been marked, a similar procedure is used to mark the rear side 92 of the roof 90.

FIG. 9a is blown-up side view through the arrowed section 9a, 9a of FIG. 9 particularly showing the feature of the protrusion 50 between the drop and drag hooks 42, 43 of the retaining adapter 40 and how it aids in gripping the top edge of the front side 91 of the roof 90.

Modifications of this invention will be readily apparent to those skilled in the art and it is intended that the invention be not limited by the embodiments disclosed herein but that the scope of the invention be defined by the appended claims.

What is claimed is:

1. A removable retaining adapter for a mechanical measuring tape device wherein said mechanical measuring tape device includes a housing with an extendable measuring tape, a locking slide button, and a belt clip on one side thereof, said retaining adapter comprising an elongated base, said base being bounded by two opposite longitudinal edges and two opposite short edges, each of said longitudinal edges having a side extending therefrom, each of said sides extending in the same direction, one of said sides having an elongated slot therein which slot has an open end along one edge of said one side and a closed end opposite said open end, and a stepped extension from one of said short edges of said base whereby said retaining adapter is slidable over said housing with said elongated slot in slidable engagement with said belt clip.

2. The retaining adapter of claim 1 wherein one of said two sides is higher than the other.

3. The retaining adapter of claim 2 wherein said elongated slot is in said higher side.

4. The retaining adapter of claim 3 wherein said elongated slot is near an upper edge of said higher side and opposite from said base.

5. The retaining adapter of claim 1 wherein said stepped extension has two parts, one part extending downwardly from one short edge of said base at a 90 degree angle therefrom and another part extending outwardly from the bottom edge of said one part at a 90 degree angle therefrom.

6. The retaining adapter of claim 5 wherein said another part has an aperture therein.

7. The retaining adapter of claim 6 wherein said aperture is in the center portion of said another part.

8. The retaining adapter of claim 7 wherein said aperture is in the shape of a snowman.

9. The retaining adapter of claim 5 wherein there is a small protrusion extending between said two parts.

10. The retaining adapter of claim 9 wherein said small protrusion and said elongated slot extend in the same direction.

11. A mechanical measuring tape device wherein said mechanical measuring tape device includes a housing with a base, an extendable measuring tape locking slide button, and a fixed retaining adapter, said retaining adapter comprising an elongated stepped element having three parts, one part being attached to the base of the housing opposite from the extendable tape side, a second part extending downwardly from one longitudinal edge of said one part at a 90 degree angle therefrom, and a third part extending outwardly from the bottom edge of said second part at a 90 degree angle therefrom.

12. The retaining adapter of claim 11 wherein said third part has an aperture therein.

13. The retaining adapter of claim 12 wherein said aperture is in the center portion of said third part.

14. The retaining adapter of claim 12 wherein said aperture is in the shape of a snowman.

15. The retaining adapter of claim 11 wherein there is a small protrusion extending between said second and third parts.

16. The retaining adapter of claim 15 wherein said small protrusion extends in the same direction as said extendable measuring tape.

17. The retaining adapter of claim 11 wherein said one part is attached to said base by screws.

18. The retaining adapter of claim 11 wherein said one part is attached to said base by welding.

19. A mechanical measuring tape device wherein said mechanical measuring tape device includes a housing, an extendable measuring tape and a locking slide button, said housing comprising an opening therein for extending said measuring tape therefrom and an elongated base, said base having a first and second end opposite each other, said opening being near said first end of said base, said housing having a retaining member extending from said second end of said base, said retaining member having two parts, a first part extending downwardly from said base at a 90 degree angle therefrom and a second part extending outwardly from a bottom edge of said first part at a 90 degree angle therefrom.

20. The mechanical measuring tape device of claim 19 wherein said second part has an aperture therein.

21. The mechanical measuring tape device of claim 20 wherein said aperture is in the center portion of said second part.

22. The mechanical measuring tape device of claim 20 wherein said aperture is in the shape of a snowman.

23. The mechanical measuring tape device of claim 19 wherein there is a small protrusion extending between said first and second parts.

24. The mechanical measuring tape device of claim 23 wherein said small protrusion extends in the same direction as said extendable measuring tape.

* * * * *